United States Patent
Polk

(10) Patent No.: US 10,388,175 B2
(45) Date of Patent: Aug. 20, 2019

(54) KIT FOR EDUCATIONAL STRUCTURES

(71) Applicant: Jessie M. Polk, Memphis, TN (US)

(72) Inventor: Jessie M. Polk, Memphis, TN (US)

( * ) Notice: Subject to any disclaimer, the term of this patent is extended or adjusted under 35 U.S.C. 154(b) by 0 days.

(21) Appl. No.: 15/978,614

(22) Filed: May 14, 2018

(65) Prior Publication Data

US 2018/0261113 A1     Sep. 13, 2018

Related U.S. Application Data

(63) Continuation-in-part of application No. 15/085,712, filed on Mar. 30, 2016, now abandoned.

(51) Int. Cl.
| | |
|---|---|
| *G09B 25/06* | (2006.01) |
| *G09B 1/32* | (2006.01) |
| *G09B 27/08* | (2006.01) |
| *G09B 19/02* | (2006.01) |
| *G09B 19/00* | (2006.01) |

(52) U.S. Cl.
CPC ........... *G09B 1/32* (2013.01); *G09B 19/0061* (2013.01); *G09B 19/02* (2013.01); *G09B 27/08* (2013.01)

(58) Field of Classification Search
USPC ..... 434/81, 96, 97, 130, 131, 133, 135, 137, 434/172, 193, 258, 430; 446/85, 100, 446/108, 114
See application file for complete search history.

(56) References Cited

U.S. PATENT DOCUMENTS

| | | | | |
|---|---|---|---|---|
| RE19,238 | E * | 7/1934 | Burke | G09B 1/06 273/157 R |
| 2,592,078 | A * | 4/1952 | Taylor | A63F 9/06 273/157 R |
| 3,374,560 | A * | 3/1968 | Forsyth | G09B 27/08 434/137 |
| 3,584,400 | A * | 6/1971 | Voges | G09B 27/08 428/542.8 |
| 4,063,369 | A * | 12/1977 | Hart | A63H 33/38 281/31 |
| 4,122,628 | A * | 10/1978 | Crowell | A63H 3/02 446/100 |
| 4,519,781 | A * | 5/1985 | Boyd | A41D 19/00 2/160 |
| 4,710,979 | A * | 12/1987 | Bull | A41B 13/10 2/48 |
| 5,080,591 | A * | 1/1992 | Forsyth | G09B 27/08 434/147 |

(Continued)

*Primary Examiner* — Kurt Fernstrom
(74) *Attorney, Agent, or Firm* — Egbert Law Offices, PLLC

(57) ABSTRACT

A kit for creating educational structures includes a plurality of barbell-shaped pieces formed of a hook-and-loop tape material. The barbell-shaped pieces include a first end, a second end, and an elongated middle section extending the first and second end. The kit includes a hub having a plurality of petals formed on a perimeter thereof, the petals having a shape corresponding to a shape of the first and second ends of the barbell-shaped pieces. The hub is also formed of a hook-and-loop material and the barbell-shaped pieces are attachable thereto. A series of attachment pieces in the shape of landmasses of the Earth are also provided. The kit can be used to create the model of a globe, various three-dimensional shapes, grids, and can be utilized for a number of different educational purposes.

19 Claims, 4 Drawing Sheets

(56) References Cited

U.S. PATENT DOCUMENTS

| | | | | |
|---|---|---|---|---|
| 5,571,019 A | | 11/1996 | Wilson | |
| 5,913,483 A | * | 6/1999 | Polk | A43B 3/0078 |
| | | | | 24/306 |
| 5,957,692 A | * | 9/1999 | McCracken | G09B 19/00 |
| | | | | 2/49.1 |
| 6,010,387 A | * | 1/2000 | Nemec | A63H 3/10 |
| | | | | 428/100 |
| 6,280,283 B1 | * | 8/2001 | Sisler | A63H 3/365 |
| | | | | 446/100 |
| 6,763,554 B1 | * | 7/2004 | Torrey | B65D 63/10 |
| | | | | 24/17 AP |
| 7,160,600 B2 | * | 1/2007 | Shepard | A44B 18/0011 |
| | | | | 428/99 |
| 7,331,790 B1 | * | 2/2008 | Shinozuka | G09B 27/08 |
| | | | | 434/135 |
| 7,914,290 B2 | * | 3/2011 | Yoon | A41D 27/08 |
| | | | | 434/260 |
| 2007/0264618 A1 | * | 11/2007 | Fuller | G09B 27/08 |
| | | | | 434/131 |

\* cited by examiner

KIT FOR EDUCATIONAL STRUCTURES

CROSS-REFERENCE TO RELATED APPLICATIONS

The present application is a continuation-in-part of U.S. application Ser. No. 15/085,712, filed on Mar. 30, 2016, presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

No applicable.

BACKGROUND OF THE INVENTION

1. Field of the Invention

The present invention relates to the field of the education, classroom teaching aids for children. The invention, particularly relates to teaching tools for children that, help develop and strengthen their knowledge of standard core curriculum skills such as social studies and mathematics, etc.

2. Description of Related Art Including Information Disclosed Under 37 CFR 1.97 and 37 CFR 1.98

Nowadays, it has become increasingly difficult for teachers and parents to find effective, age-appropriate teaching aids for children. Most teaching aids currently on the market are found in one box, leaving the educators, parents, and other caregivers to buy multiple boxes of games and activities that are not compelling enough to engage children. Other aids that may be limited to only one topic or subject when boxed, can become repetitive and boring.

There are numerous types of teaching aids or tools that are available in the prior art and found in the market place. For example, see: U.S. patent application Ser. No. 13/025,243 to Jeffery; U.S. Pat. No. 6,626,675 to Sharon; U.S. Pat. No. 5,076,793 to Aghevli et al.; U.S. Pat. No. 5,571,019 to Dallas; U.S. Pat. No. 5,980,263 to Karen.

U.S. patent application Ser. No. 13/025,243 discloses a method of facilitating physical exercise and a better understanding of a subject category, comprising an interactive game for play by a number of persons; placing a device into a field of play by a first team, wherein the device provides to a second team a plurality of possible answers to a question and/or direction to be responded to by the second team; displaying around a periphery of the device a plurality of possible answers to the question; wherein placing the device into the field of play includes striking the device by a member of the first team for subsequent fielding of said device by the second team; and, wherein the member of the first team continually runs from one base to another base until at least the second team fields the device and answers the question.

Another prior art U.S. Pat. No. 6,626,675 discloses multiple activity apparatus for visual educational, recreational or therapeutic uses having plural, positionable utility panels which can be collapsed for convenient portability. The invention comprises three utility panels which include rectangular frame members joined at abutting ends in a triangular configuration having open triangular ends, a base frame and two upwardly converging side frames. A utility board is mounted in each respective frame member, each boards having an exterior work or display surface whereby a pair of upright utility panels is selectively positionable, with the remaining panel providing a base.

Another prior art U.S. Pat. No. 5,076,793 discloses fractal mathematics learning kit that includes a plurality of boards each in the shape of an equilateral triangle having defined thereon a pattern of ten smaller equilateral triangles, and a plurality of manipulative elements made of one or more connected equilateral triangles which are attached to the equilateral triangles defined on the boards. A set of tokens thick enough to stand on an edge and comprising combinations of equilateral triangles to represent numbers is also included. Also included in the kit is a mat defining rows and columns of fractal representations of numbers by which various mathematical operations can be understood.

Yet another prior art U.S. Pat. No. 5,571,019 discloses system for teaching the basic concepts of mathematics utilizing a ball or the like having situated thereon certain mathematical problems and solutions, each such problem having framed thereabout certain colored geometric symbols, the symbols indicating certain commonalities in the problem. The ball is to be utilized in organized or unorganized play, and is configured in such a manner so as to relay to the user certain basic themes associated with mathematics, including (but not limited to) addition, subtraction, multiplication, and division.

Yet another prior art U.S. Pat. No. 5,980,263 discloses a teaching apparatus comprising a three-dimensional geometrical object having a surface divided into a plurality of segments, each of which includes a question relating to a particular field of liberal arts study. The three-dimensional geometrical object is a sphere, and the plurality of segments is defined by visible lines provided on the sphere's surface.

It can be observed that the prior art mentioned above provide an interactive way of teaching for only single topic or subject and none provide a multiple skill development for students with a multi-skills teaching aid or tool. Hence, there is a need in the art for a teaching aid that develops multiple skills in children while making it interesting and interactive. The present invention provides a multi-skill activity center for creative teachers, instructors or parents. The present invention presents multiple skills for the development of children's knowledge in core curriculum areas such as mathematics, geography, and the like.

It is an object of the present invention to provide an educational tool which makes acquiring knowledge-based information and skills fun.

It is another object of the present invention to provide educational tool which can assist in developing skills for children and core curriculum areas such as mathematics geometry or the like.

It is another object of the present invention to provide an educational tool on which can be a teaching aid that creates classroom activities without the use of pencil and paper.

It is another object of the present invention to provide an educational tool and teaching aid that stays in place until completed.

It is another object of the present invention to provide a kit for creating a model of a globe and other three-dimensional structures.

These and other objects and advantages of the present invention will become apparent from a reading of the attached application and appended claims.

BRIEF SUMMARY OF THE INVENTION

One embodiment of the present invention is a kit for creating educational structures. The kit includes a plurality of barbell-shaped pieces. Each of the barbell-shaped pieces has a first end, a second end, an elongated middle section extending between the first and second ends, a top loop surface and a bottom hook surface. The kit additionally includes a hub with plurality of petals formed on the perimeter of the hub. Each of the plurality of petals has a shape corresponding to a shape of the first and second end of the plurality of barbell-shaped pieces. The hub is formed of the hook and loop material and has a hook surface and a loop surface.

In the present invention, the hub and each of the plurality of petals may have a circular shape, wherein the plurality of petals are circumferentially spaced about a circumference of the hub. In the present invention, the first and second end of each of the plurality of barbell-shaped pieces may be circular.

The kit of the present invention may also include a second circular hub having a plurality of circular petals formed along the circumference thereof, and a plurality of attachment pieces. The attachment pieces are constructed of a hook-and-loop material and are in the shape of landmasses of the earth.

The kit of the present invention may also include a plurality of alphanumeric characters each have hook-and-loop surfaces.

In the kit of the present invention, the plurality of barbell-shaped piece may include a first barbell-shaped piece having a first length and a second barbell-shaped piece having a second length greater than the first length of the first barbell-shaped piece.

In the present invention, the plurality of barbell-shaped pieces are preferably constructed of a hook-and-loop tape material.

The present invention is also a kit for constructing a model of the earth. The kit preferably includes a plurality of barbell-shaped pieces with a first end, a second end, an elongated middle section extending between the first and second ends, a loop surface, and hook surface. A first hub and second hub are also included. Each of the first and second hubs have a loop surface, a hook surface and a plurality of petals formed on a perimeter of the hub. Each of the petals has a shape corresponding to a shape of the first end and the second end of each of the plurality of barbell-shaped pieces. The kit also includes a plurality of attachment pieces. The attachment pieces have at least one of a hook-and-loop surface. The attachment pieces are in the shape of landmasses of the earth.

In the present invention, the first and second end of the plurality of barbell-shaped pieces may be circular and each of the plurality of petals of the first and second hub are also circular.

In an embodiment of the present invention, the plurality of the petals of the first hub are circumferentially spaced about a circumference of the first hub and a plurality of petals of the second hub are circumferentially spaced about the circumference of the second hub. Preferably, the plurality of petals of the first hub comprises eight petals.

In the present invention, the elongated middle section of each of the plurality of barbell-shaped pieces preferably has a width between one-third and one-half of the diameter of the first and second end of the barbell-shaped piece.

In the kit of the present invention, the plurality of barbell-shaped pieces may be adapted to attached to the plurality of petals of the first hub and the plurality petals of the second hub.

Preferably, in the kit of the present invention, the hook surface of one of the plurality of barbell-shaped pieces is adapted to attached to the loop surface of another of the plurality of barbell-shaped pieces. Preferably, each of the plurality of barbell-shaped pieces is constructed of a hook-and-loop tape material.

The present invention is also a kit for constructing a model of the earth including a plurality of barbell-shaped pieces formed of a hook-and-loop tape material and including a first circular end, a second circular end, and an elongated middle section extending between the first and second ends. The elongated middle section has a width between one-third and one-half of the diameter of the first circular end and the second circular end. The kit also includes first and second hubs each having a plurality of petals formed on a respective perimeter thereof. The plurality petals each have a circular shape corresponding in size to the first end and the second end of the plurality barbell-shaped pieces. The plurality petals are circumferentially spaced about the respective hub, and each of the first hubs and second hubs are formed of a hook-and-loop material. The kit additionally includes a plurality of attachment pieces in the shape of landmasses of the earth. The plurality of attachment pieces preferably each have a loop surface and a hook surface.

In the kit of the present invention, a plurality of alphanumeric characters may also be provided wherein each has a loop surface and a hook surface.

DETAILED DESCRIPTION OF THE INVENTION

Figure 1:
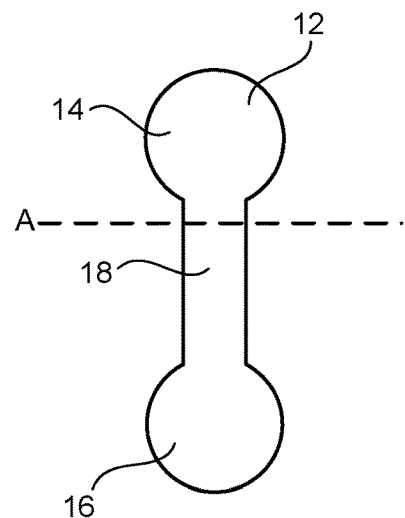
FIG. 1 is a top view of one of the plurality of barbell-shaped pieces of the kit of the present invention.

Referring to FIG. 1, there is shown a barbell-shaped piece 12 that is provided in the kit of the present invention. The remaining pieces of the kit will be described herein below. The barbell-shaped piece 12 has a first end 14 opposite a second end 16. Preferably, each of the first end 14 and the second end 16 are of a circular shape. However, other shapes can be utilized within the concept of the present invention.

The barbell-shaped piece 12 has an elongated middle portion 18 extending between the first end 14 and the second end 16. Preferably, the elongated middle portion 18 has a width of between one-third and one-half of a diameter of the circular first end 14 and second end 16.

In FIG. 1, it can be seen how the relatively thin width of the elongated middle portion 18 allows the barbell-shaped piece 12 to be biased such that it can will fold over an axis A perpendicular to the longitudinal axis of the elongated middle portion 18. As will be appreciated upon further reading the specification, this allows for ease of use of the barbell-shaped piece 12 of the present invention as compared to other possible shapes of such pieces. At the same time, the elongated middle portion is wide enough to prevent twisting or torsion, such that structures created using the barbell-shaped piece 12 to have significant rigidity.

In a preferred embodiment of the present invention, the barbell-shaped pieces 12 are constructed of a hook-and-loop tape material. Such a material is sold under the trade name "Velcro One-Wrap® tape.

Figure 2:
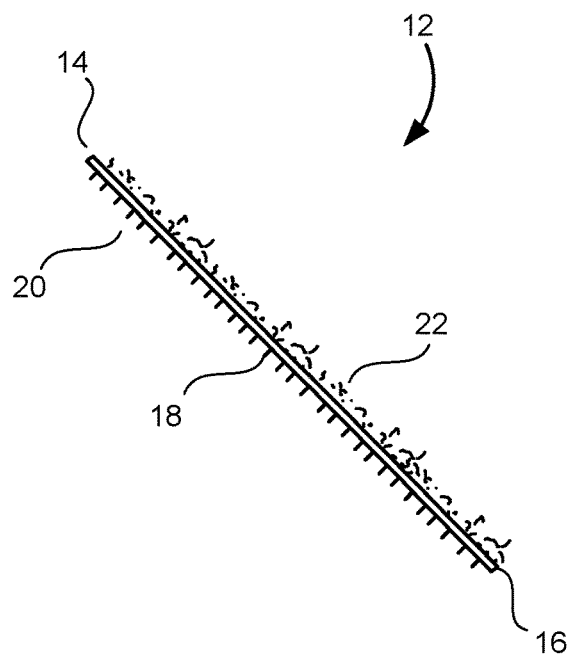
FIG. 2 illustrates a side view of a barbell-shaped piece of the kit of the present invention.

FIG. 2 shows a side view of a barbell-shaped piece 12 in accordance with a preferred embodiment of the present invention. In FIG. 2 it can be seen how the barbell-shaped piece 12 has a hook surface 20 opposite a loop surface 22. As can be seen in FIG. 2, the hook-and-loop surfaces are consistent along the length of the barbell-shaped pieces such that the first end 14, second end 16 and the elongated middle portion 18 each are constructed of the same material. FIG. 2 also shows how the hook-and-loop tape material has a very thin profile allowing the barbell-shaped piece to be easily folded upon itself, or wrapped about an item. The tape aspect of the hook-and-loop material forming the barbell-shaped pieces 12 allows for easy manipulation by students and children using the kit of the present invention. It can be appreciated that other hook-and-loop materials having a thicker and more substantial center section between the hook surface and the loop surface can be more difficult to manipulated into shapes and formations as required by the kit of the present invention.

Figure 3:
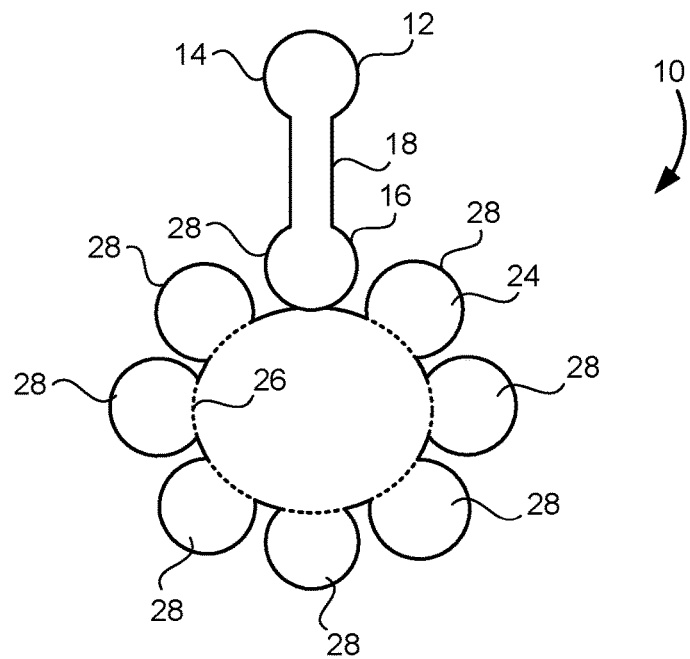
FIG. 3 shows a top view of a hub of the kit of the present invention, wherein one of the barbell-shaped pieces is attached thereto.

Referring to FIG. 3, there is shown the kit 10 of the preferred embodiment of the present invention. As discussed herein above, the kit 10 of the present invention is an educational tool that can be utilized to create a number of different teaching aids and activities for children and students, including a globe or model of the earth. FIG. 3 shows another portion of the kit 10, namely the hub 24. The hub 24 is preferably circular and has a plurality of petals 28 formed along a perimeter or circumference 26 thereof. The plurality of petals are preferably circumferentially spaced about the circumference or perimeter of the hub 24.

Preferably, the shape and size of the petals 28 corresponds to the shape and size of the first end 14 and second end 16 of the barbell-shaped pieces.

FIG. 3 also shows one barbell-shaped piece 12 affixed to the hub 24. The hub 24 is preferably formed of a hook-and-loop material, although is not absolute necessary that it be of a hook-and-loop tape material. As such, the hook surface of the second end 16 of the barbell-shaped piece 12 is affixed to a loop surface, facing upwardly, of the hub 24, or vice versa. At a minimum, the kit 10 of the present invention includes a hub 24 and a plurality of barbell-shaped pieces 12. However, the kit 10 preferably includes a second identical hub and a plurality of attachment pieces, which will be described herein below.

In the preferred embodiment, as discussed, the shape and size of the petals corresponds to the shape and size of the first and second ends 14 and 16 of the barbell-shaped pieces 12. This allows relatively easy placement of the barbell-shaped pieces 12 on the hub 24. However, the fact that each of the pieces are circular requires the student to judge how to properly place in the barbell-shaped piece onto the hub so as to create a structure. In contrast, were the petals and the first and second ends square in shape, there would be only one "right way" to place the piece.

Due to the hub being composed of a hook-and-loop material, the barbell-shaped piece 12 could be placed on either the top of the petal 28 (as shown in FIG. 3), or alternatively on the lower surface of the petal 28.

The petals 28 of the hub 24 are formed so as to easily bend at the circumference 26 of the hub 24. As will be appreciated from a reading the specification, this is preferable in helping to forming a globe or other three-dimensional structure with the kit 10 of the present invention.

Figure 4:
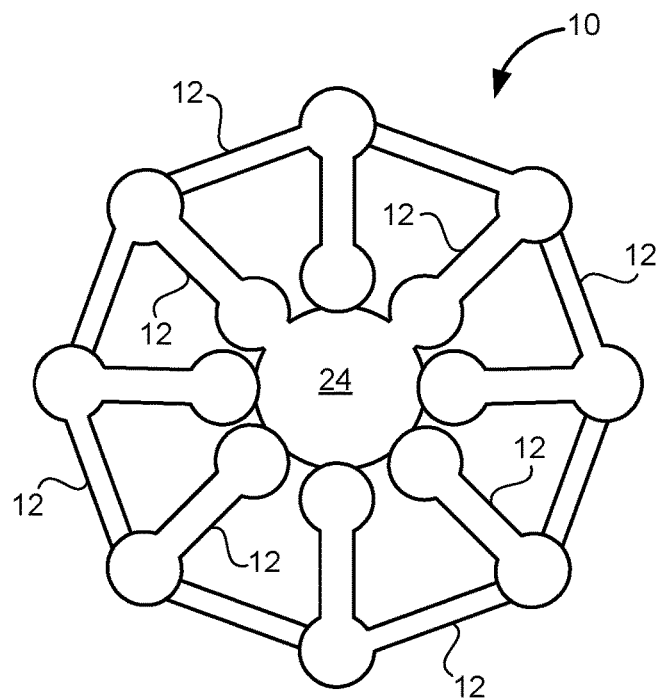
FIG. 4 shows a bottom view of a hemisphere of a globe created using the kit of the present invention.

FIG. 4 illustrates a first step in completing a globe 30 with the kit 10 of the present invention. In FIG. 4, it can be seen how eight barbell-shaped pieces 12 have been attached to the respective petals of the hub 24 so as to extend outwardly therefrom. Next, another plurality of barbell-shaped pieces are assembled to form a circular shape about the hub 24, and are connected to the barbell-shaped pieces 12 which extend outwardly from the hub 24. The circular shape could be utilized as an equatorial band for creation of the globe, or can represent a line of latitude other than the equatorial band.

Figure 5:
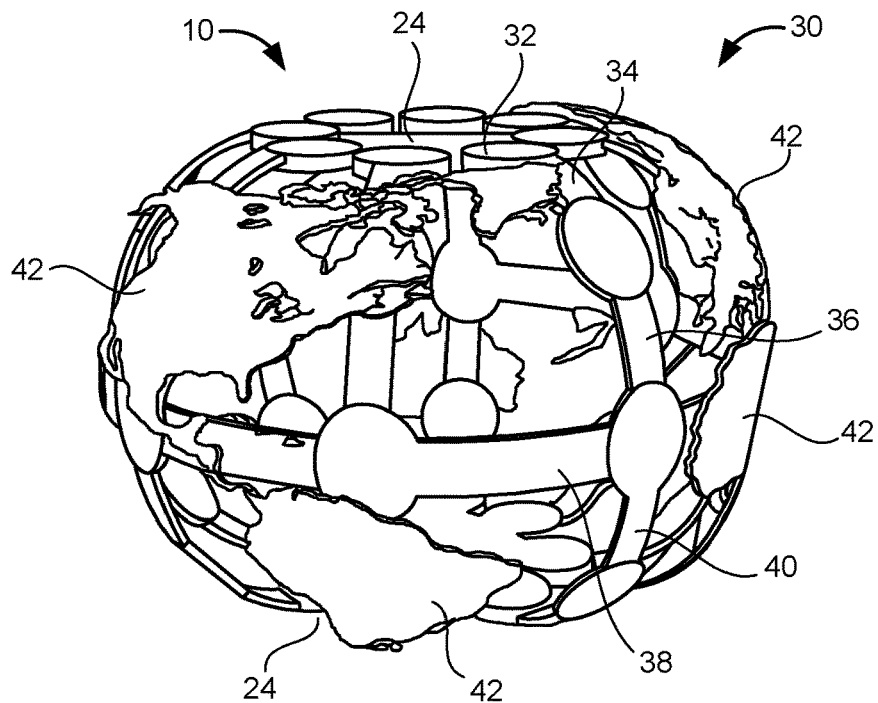
FIG. 5 illustrates a perspective view of a globe created using the kit of the present invention.

Referring to FIG. 5, there is shown the kit 10 of the preferred embodiment of the present invention as utilized to form a globe 30. Hubs 24 can be seen at both the north and south poles of the globe 30. A plurality of barbell-shaped pieces 12 have been attached to each of the hubs 24, as shown in FIG. 3 and FIG. 4, to form part of a hemisphere of the globe 30.

FIG. 5 shows a barbell-shaped piece 32 extending from the hub 24 forming the northern hemisphere of the globe. This barbell-shaped piece 32 or is connected to a second barbell-shaped piece 36. The barbell-shaped piece 36 is joined with an equatorial band 38 comprised of a plurality of barbell-shaped pieces. Connected to either of the barbell-shaped piece 36 and the equatorial band 38 is another barbell-shaped piece 40 which extends towards the hub 24 at the southern pole of the globe 30.

Importantly, FIG. 5 also shows a plurality of attachment pieces 42 in the shape of continents or landmasses of the earth. These attachment pieces 42 are preferably in the form of a hook-and-loop material such that they can be attached to the grid formed of the plurality of barrel shaped pieces which comprise the globe 30. As can be appreciated, the use of the kit of the present invention to create a globe would test a student's geographical knowledge and also his or her fine motor skills, which are required to accurately form the globe and to place the attachment pieces 42 in a proper manner and location. In one embodiment the present invention, the kit can also include labels for the continent/landmass attachment pieces.

Figure 6:
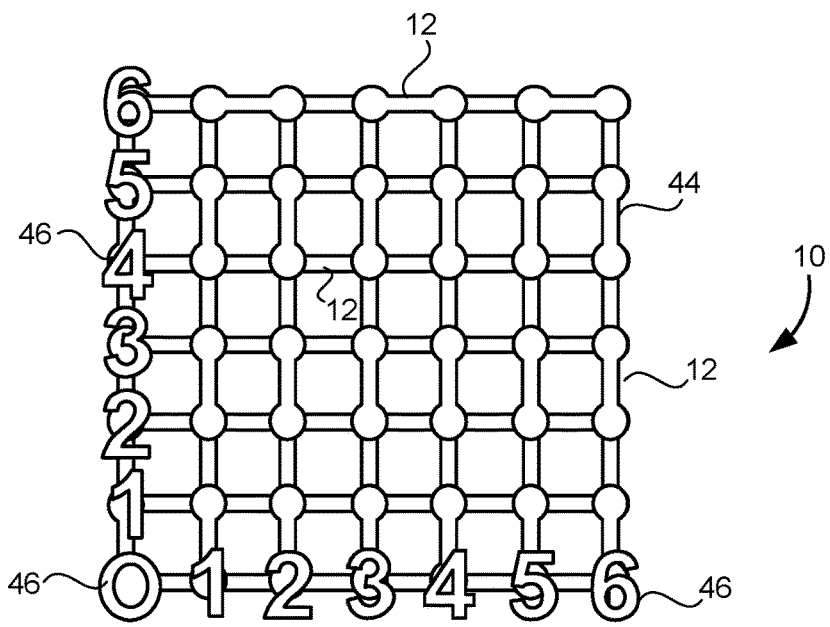
FIG. 6 illustrates the barbell-shaped pieces of the kit of the present invention utilized to create a graph having alphanumeric characters thereon.

Referring to FIG. 6, there is shown the kit 10 of the present invention being utilized to form a grid 44. A plurality of alphanumeric characters 46 are shown as being positioned on the grid 44. Additionally, the grid 44, comprising a plurality of barbell-shaped pieces 12, can be used for flat map applications instead of the previously-described globe.

As can be appreciated, a number of different teaching activities could be conducted by utilizing the kit of the present invention. The alphanumeric characters 46, similar to the other attachment pieces available with the kit 10 of the present invention, are preferably formed of a hook-and-loop material for easy attachment and detachment from the grid or globe.

Figure 7:
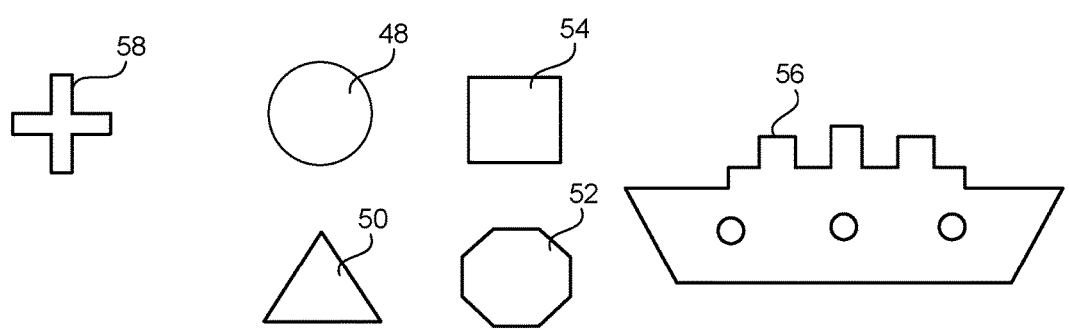
FIG. 7 illustrates a plurality of other attachment pieces that can be used with the kit of the present invention.

FIG. 7 illustrates a number other possible shapes for use as attachment pieces within the concept of the present invention. For example, FIG. 7 shows circles 48, triangles 50, octagons 52, squares 54 and boats 56. The boats 56, for example, can be used on a grid application with the kit of the present invention so as to teach children the concept of coordinates. Mathematical symbols 58 can also be provided to increase the versatility of the kit 10 of the present invention.

The kit of the present invention enables instructors and parents to create one or more learning stations and allow students to use the learning stations to develop instructed learning activities. The kit can include brightly colored letters, numerals and other symbols. The barbell-shaped pieces can be a contrasting in color to the attachment pieces or the alphanumeric characters.

The barbell-shaped pieces 12 of the present invention can also be utilized to create solid geometrical shapes such as pyramids, cubes and spheres. The elongated middle section 18 of the barbell-shaped pieces 12 facilitates, in particular, the creation of shapes requiring 90-degree and greater angles.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A kit for creating educational structures comprising:
   a plurality of barbell-shaped pieces, each of said plurality of barbell-shaped pieces formed of a hook-and-loop material and comprising:
      a first end;
      a second end;
      an elongated middle section extending between said first end and said second end;
      a top loop surface; and
      a bottom hook surface; and
   a hub having a plurality of petals formed on a perimeter of said hub; each of said plurality of petals having a shape corresponding to a shape of said first end and said second end of each of said plurality of barbell-shaped pieces, said hub being formed of a hook-and-loop material and having a loop surface and a hook surface.

2. The kit of claim 1, said hub and each of said plurality of petals having a circular shape, said plurality of petals being circumferentially spaced about a circumference of said hub.

3. The kit of claim 2, said first end and said second end of each of said plurality of barbell-shaped pieces being circular.

4. The kit of claim 2, further comprising:
   a second circular hub having a plurality of circular petals formed along a circumference of said hub; and
   a plurality of attachment pieces each having a loop surface and a hook surface, said plurality of attachment pieces being in the shape of land masses of the earth.

5. The kit of claim 1, further comprising:
   a plurality of alphanumeric characters each having a loop surface and a hook surface.

6. The kit of claim 1, said plurality of barbell-shaped pieces comprising:
   a first barbell-shaped piece having a first length; and
   a second barbell-shaped piece having a second length greater than said first length of said first barbell-shaped piece.

7. The kit of claim 1, said plurality of barbell-shaped pieces being constructed of a hook-and-loop tape material.

8. A kit for constructing a model of the earth, the kit comprising:
   a plurality of barbell-shaped pieces each having a first end, a second end, an elongated middle section extending between said first end and said second end, a loop surface, and a hook surface,
   a first hub;
   a second hub, each of said first hub and said second hub having a loop surface, a hook surface and plurality of petals formed on a perimeter of said hub, each of said plurality of petals having a shape corresponding to a shape of said first end and said second end of each of said plurality of barbell-shaped pieces; and
   a plurality of attachment pieces having at least one of a hook surface and a loop surface, said plurality of attachment pieces attachment pieces being in the shape of land masses of the earth.

9. The kit of claim 8, said first end and said second end of each of said plurality of barbell-shaped pieces being circular, each of said plurality of petals of said first hub and said second hub being circular.

10. The kit of claim 9, said plurality of petals of said first hub being circumferentially spaced about a circumference of said first hub, said plurality of petals of said second hub being circumferentially spaced about a circumference of said second hub.

11. The kit of claim 10, said plurality of petals of said first hub comprising eight petals.

12. The kit of claim 9, said elongated middle section of each of said plurality of barbell-shaped pieces having a width between one third and one half of a diameter of said first end and said second end.

13. The kit of claim 8, said plurality of barbell-shaped pieces being adapted to attach to said plurality of petals of said first hub and said plurality of petals of said second hub.

14. The kit of claim 8, the hook surface of one of said plurality of barbell-shaped pieces adapted to attach to the loop surface of another of said plurality of barbell-shaped pieces.

15. The kit of claim 8, said plurality of barbell-shaped pieces being constructed of a hook-and-loop tape material.

16. A kit for constructing a model of the earth, the kit comprising:
   a plurality of barbell-shaped pieces, each of said plurality of barbell-shaped pieces formed of a hook-and-loop tape material and comprising:
      a first circular end;
      a second circular end; and
      an elongated middle section extending between said first end and said second end, said elongated middle section having a width between one third and one half a diameter of said first circular end and said second circular end;
   first and second hubs each having a plurality of petals formed on a respective perimeter thereof; each of said plurality of petals having a circular shape corresponding in size to said first end and said second end of each of said plurality of barbell-shaped pieces, said plurality of petals being circumferentially spaced about the respective hub, each of said first hub and said second hub being formed of a hook-and-loop material; and a plurality of attachment pieces each having a loop surface and a hook surface, said plurality of attachment pieces being in the shape of land masses of the earth.

17. The kit of claim 16, further comprising:

a plurality of alphanumeric characters each having a loop surface and a hook surface.

18. The kit of claim 16, said plurality of barbell-shaped pieces adapted to be assembled in a grid formation.

19. The kit of claim 18, further comprising:

another plurality of attachment pieces each having a loop surface and a hook surface, said another plurality of attachment pieces being in the shape of alphanumeric characters, said another plurality of attachment pieces being removably attachable to said grid formation.

\* \* \* \* \*